United States Patent
Conner et al.

(10) Patent No.: US 10,516,683 B2
(45) Date of Patent: Dec. 24, 2019

(54) SYSTEMS AND METHODS FOR SECURITY BREACH DETECTION IN VEHICLE COMMUNICATION SYSTEMS

(71) Applicant: Ford Global Technologies, LLC, Dearborn, MI (US)

(72) Inventors: Dana Conner, Southfield, MI (US); Mahmoud Yousef Ghannam, Canton, MI (US); Darren Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 15/433,916

(22) Filed: Feb. 15, 2017

(65) Prior Publication Data

US 2018/0234446 A1    Aug. 16, 2018

(51) Int. Cl.
| | |
|---|---|
| *H04L 29/06* | (2006.01) |
| *B60R 25/30* | (2013.01) |
| *B60W 50/14* | (2012.01) |
| *B60W 50/038* | (2012.01) |
| *B60W 50/02* | (2012.01) |

(Continued)

(52) U.S. Cl.
CPC .......... *H04L 63/1425* (2013.01); *B60R 25/30* (2013.01); *B60W 50/0205* (2013.01); *B60W 50/0225* (2013.01); *B60W 50/038* (2013.01); *B60W 50/14* (2013.01); *H04W 4/48* (2018.02); *H04W 12/1204* (2019.01); *B60W 2540/04* (2013.01)

(58) Field of Classification Search
CPC ... H04L 63/1425; H04L 67/12; H04L 1/0061; H04L 63/1416; H04W 48/04; G06F 21/565; B60R 25/30; B60W 50/0205; B60W 50/0225; B60W 50/14; B60W 2540/04; B60W 50/038
USPC ................ 726/22–23; 714/36, 43, 48–49, 52
See application file for complete search history.

(56) References Cited

U.S. PATENT DOCUMENTS

| | | | |
|---|---|---|---|
| 5,428,629 A | * | 6/1995 | Gutman ................ H04L 1/0057 714/758 |
| 5,937,065 A | | 8/1999 | Simon et al. |

(Continued)

OTHER PUBLICATIONS

Weiying Zeng et al, In-Vehicle Networks Outlook: Achievements and Challenges, IEEE (Year: 2016).*

(Continued)

*Primary Examiner* — Shanto Abedin
(74) *Attorney, Agent, or Firm* — Geoffrey Brumbaugh; McCoy Russell LLP

(57) ABSTRACT

Systems and methods for detection of security breaches in intravehicular communication systems are disclosed. In some embodiments, this may include intravehicular communication using messages sent with a checksum and a dynamic mathematical operator field. Errors in the checksum may be interpreted as ordinary transmission errors, whereas errors in the dynamic mathematical operator field may be interpreted as potential threats. Repeated errors in the dynamic mathematical operator, and/or unexpected messages in the intravehicular communications, may be interpreted as confirmed hacking. Upon confirmation of hacking, a warning may be issued to an operator and a vehicle safe mode may be entered, including restricting vehicle functionality.

10 Claims, 6 Drawing Sheets

(51) Int. Cl.
*H04W 12/12* (2009.01)
*H04W 4/48* (2018.01)

(56) References Cited

U.S. PATENT DOCUMENTS

| | | | |
|---|---|---|---|
| 6,130,622 A | 10/2000 | Hussey et al. | |
| 6,360,152 B1 | 3/2002 | Ishibashi et al. | |
| 6,658,328 B1 | 12/2003 | Alrabady et al. | |
| 2003/0172292 A1* | 9/2003 | Judge | G06F 21/554 726/23 |
| 2007/0101236 A1 | 5/2007 | Bauerle et al. | |
| 2011/0247075 A1 | 10/2011 | Mykland et al. | |
| 2011/0295444 A1* | 12/2011 | Westra | G06F 21/30 701/1 |
| 2013/0145482 A1* | 6/2013 | Ricci | H04W 4/90 726/28 |
| 2013/0227648 A1* | 8/2013 | Ricci | G06F 3/0484 726/3 |
| 2015/0120129 A1* | 4/2015 | Lee | B60R 16/0231 701/29.1 |
| 2015/0124597 A1* | 5/2015 | Mabuchi | H04L 12/413 370/230 |
| 2016/0381068 A1* | 12/2016 | Galula | H04L 63/123 726/23 |
| 2017/0093866 A1* | 3/2017 | Ben-Noon | H04L 9/3234 |
| 2017/0230385 A1* | 8/2017 | Ruvio | H04L 63/1416 |
| 2018/0099643 A1* | 4/2018 | Golsch | B60R 25/24 |
| 2018/0109622 A1* | 4/2018 | Galula | H04L 67/12 |
| 2018/0191738 A1* | 7/2018 | David | G06F 21/55 |
| 2018/0373866 A1* | 12/2018 | Sweeney | G06F 21/577 |

OTHER PUBLICATIONS

Held, Inter-and Intra-Vehicle Communications, pp. 104-111, Auerbach Publications, Boca Raton, Florida, USA.

* cited by examiner

SYSTEMS AND METHODS FOR SECURITY BREACH DETECTION IN VEHICLE COMMUNICATION SYSTEMS

FIELD

The present description relates generally to methods and systems for in-vehicle communication security, particularly the detection of security breaches, hacking, or malicious tampering with one or more in-vehicle systems communicatively coupled to a bus or other communicative pathway.

BACKGROUND/SUMMARY

Modern vehicle systems are increasingly reliant on electronic communications. Communication between different engine subsystems, sensors, actuators, electronic control units (ECUs), and other systems may enable improved control of a vehicle, however such systems may be vulnerable to attack in the form of hacking or malicious tampering. This problem is compounded by the fact that many vehicle systems may be communicatively coupled to one another by one or more buses, e.g. by a Controller Area Network (CAN) bus. In the case where many ECUs or vehicle subsystems are in communicative contact with one another via a bus, as is common in modern vehicles, even small digital security breaches may result in significant problems for a vehicle operator. For example, a hacker or other malicious entity may be able to use small security holes in a multimedia system, accessed via wireless Internet connection or Bluetooth, to gain access to communication on the vehicle's CAN bus. The hacker may then be able to distribute control messages to other vehicle systems via the CAN bus, thereby gaining control of many vehicle subsystems. It should go without saying that this kind of malicious interference is undesirable for the safety of the vehicle operator and for the reliable operation of the vehicle. Thus there is a need for vehicle communication systems which are able to detect this kind of malicious tampering when it occurs and take compensatory action.

Intra-vehicle communications, such as CAN messages (also called CAN frames) are typically provided with a checksum or cyclic redundancy check in a conventional manner to detect transmission errors. For example, a checksum may be a simple sum of each byte in a message. Upon receipt of the message, the recipient may verify the integrity of the message by computing the sum of each byte of said message and comparing it to the checksum, which is included therewith. If the two are equal, the message is assumed to be delivered intact, otherwise a transmission error may have occurred. While conventional checksums are effective tools for detecting transmission errors, there may be no provision for detection of hacking or tampering in systems which only use a conventional checksum system, since it may be assumed that a hacker knows about the existence of the checksum and is able to generate messages which pass this test.

Thus, the inventors herein have recognized that the provision of a data field generated by a dynamic mathematical operator (DMO), in addition to an optional checksum or other communication verification check, in intra-vehicle communication messages may provide a simple and robust method for detecting the presence of hacking. The checksum may be a conventional sum or cyclic redundancy check, according to known and publicly-accessible methods, whereas the dynamic mathematical operator may comprise a mathematical function using parameters which are not known to the public. The checksum may still be employed to detect transmission errors, according to conventional methods, whereas the DMO may be employed for detecting hacking. Since the parameters used in computing the DMO may not be publicly-known, it may be difficult or impossible for a hacker to correctly guess the output of the DMO, which may be provided as part of a CAN bus message, for example. Thus, a method may be provided for differentiating transmission errors from hacking attempts, since messages with a correct checksum and an incorrect DMO output may be indicative of potential hacking.

The systems and methods described herein may be provided with tables of parameters for computing the DMO, indexed according to a key. The key and corresponding parameters may be changed at regular intervals, on an event-driven basis, and/or responsive to a DMO error, in order to prevent potential hackers from guessing or learning the mathematical operation used in the DMO. The systems and methods disclosed herein may also make use of various engine operating parameters and the content of the intra-vehicle communication messages to determine if hacking has occurred on the basis of expected change in parameter values. In one example, hacking may be determined and/or differentiated from transmission errors by a method. The method may include receiving a message including a first parameter and a second parameter; evaluating the first parameter based on a first mathematical operation and evaluating the second parameter based on a second mathematical operation; indicating a transmission error in response to an error in the first parameter; and indicating a security breach in response to an error in the second parameter. In another example, the above-named objects may be achieved by a method comprising, in response to an error in a parameter, requesting that a message comprising the parameter be resent and incrementing an error counter; and in response to the error counter exceeding a threshold, issuing a warning to an operator indicating likely hacking and entering a vehicle safe mode. In yet another example, these object may be achieved by a system. The system may include a controller area network (CAN) bus; an ECU connected to the CAN bus, an actuator, and a sensor; a processor connected to the CAN bus, and including computer-readable instructions stored in non-transitory memory for: receiving a message from the ECU, the message including first and second fields; in response to an error in the first field, requesting retransmission of the message; in response to an error in the second field, requesting retransmission of the message and incrementing an error counter; and in response to the error counter exceeding a threshold, issuing a warning to an operator and adjusting an operating parameter of an engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
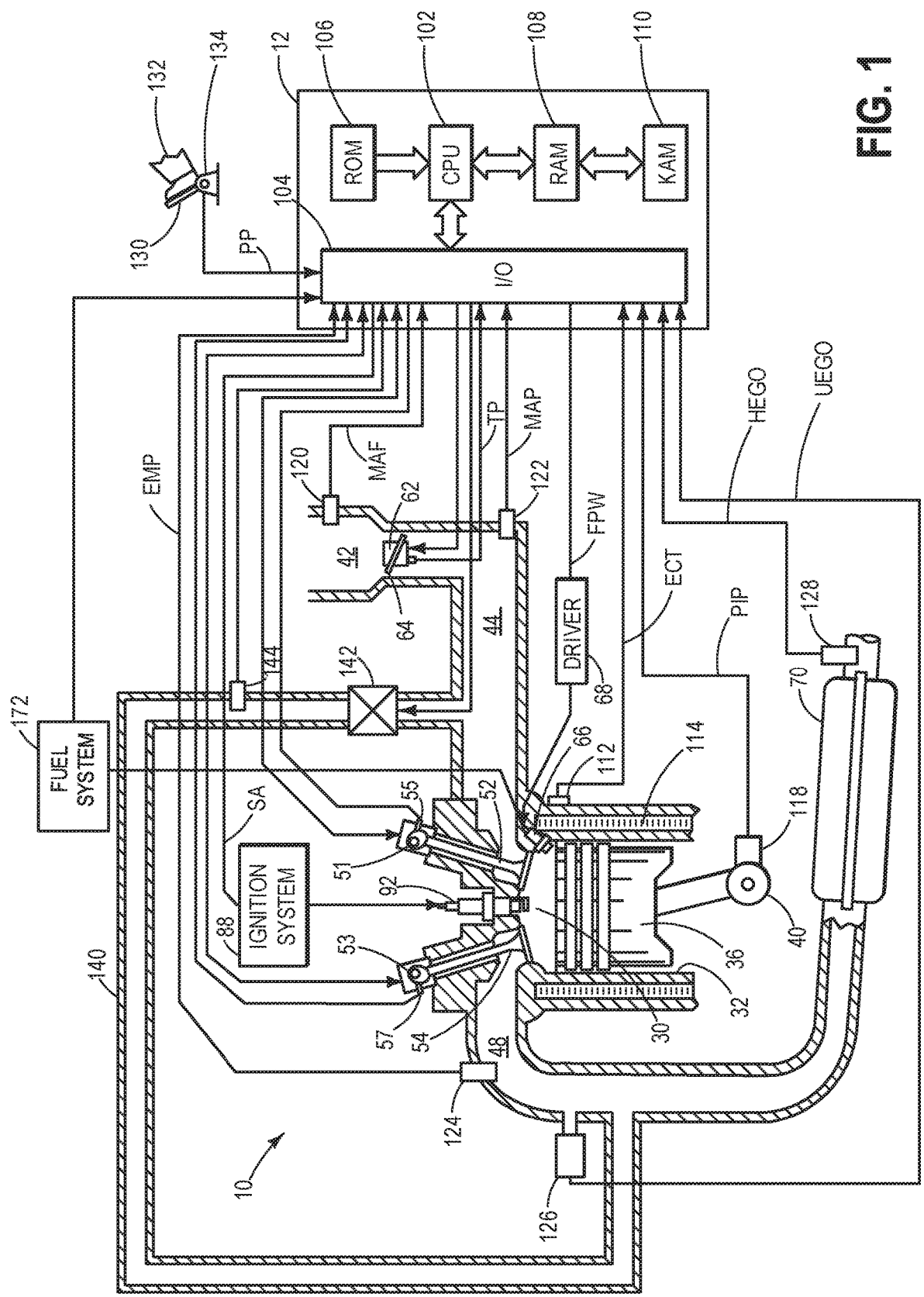
FIG. 1 schematically depicts an engine system as an exemplary technical environment.
Figure 2:
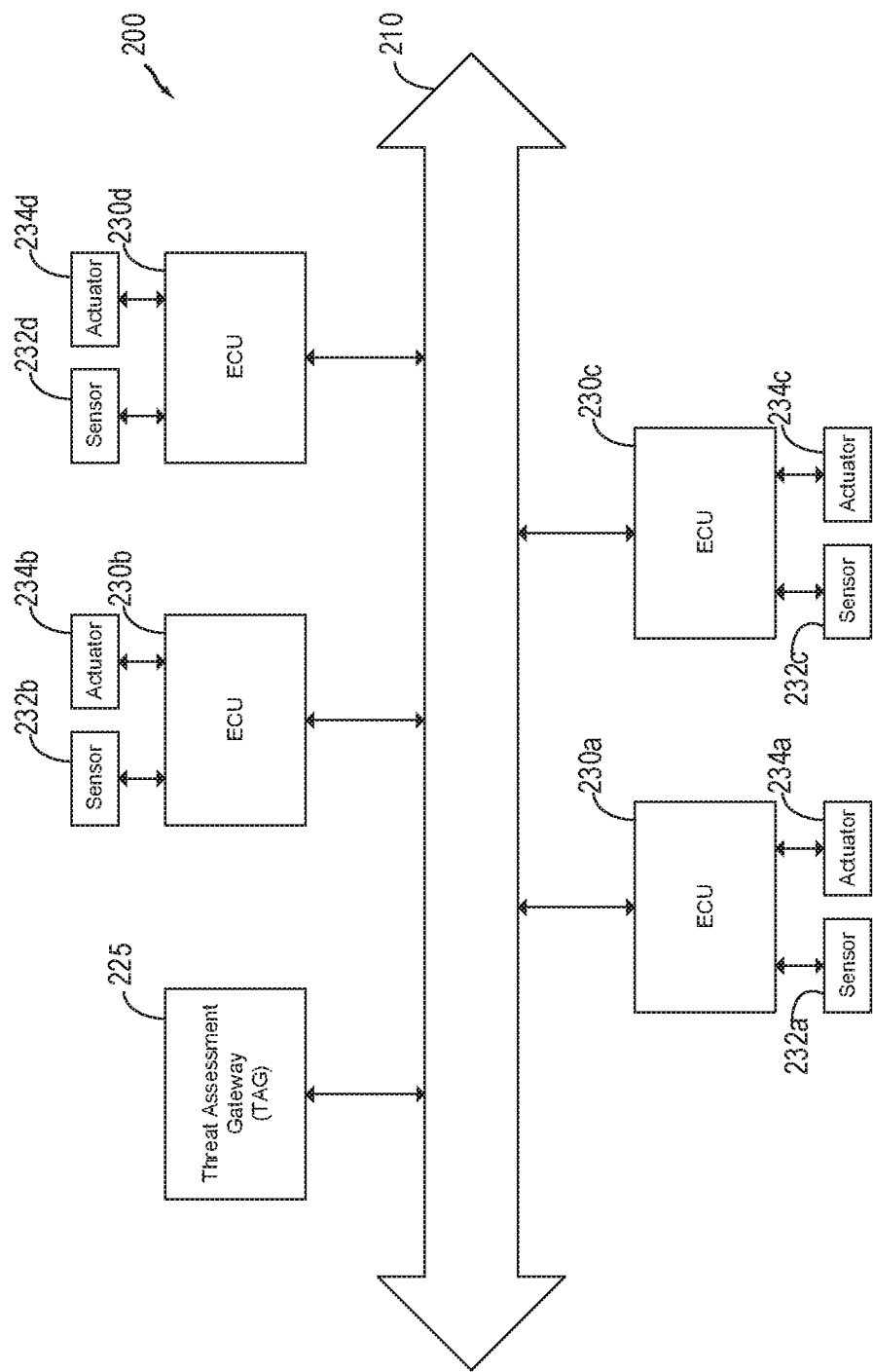
FIG. 2 schematically depicts a CAN bus and associated systems.
Figure 5:
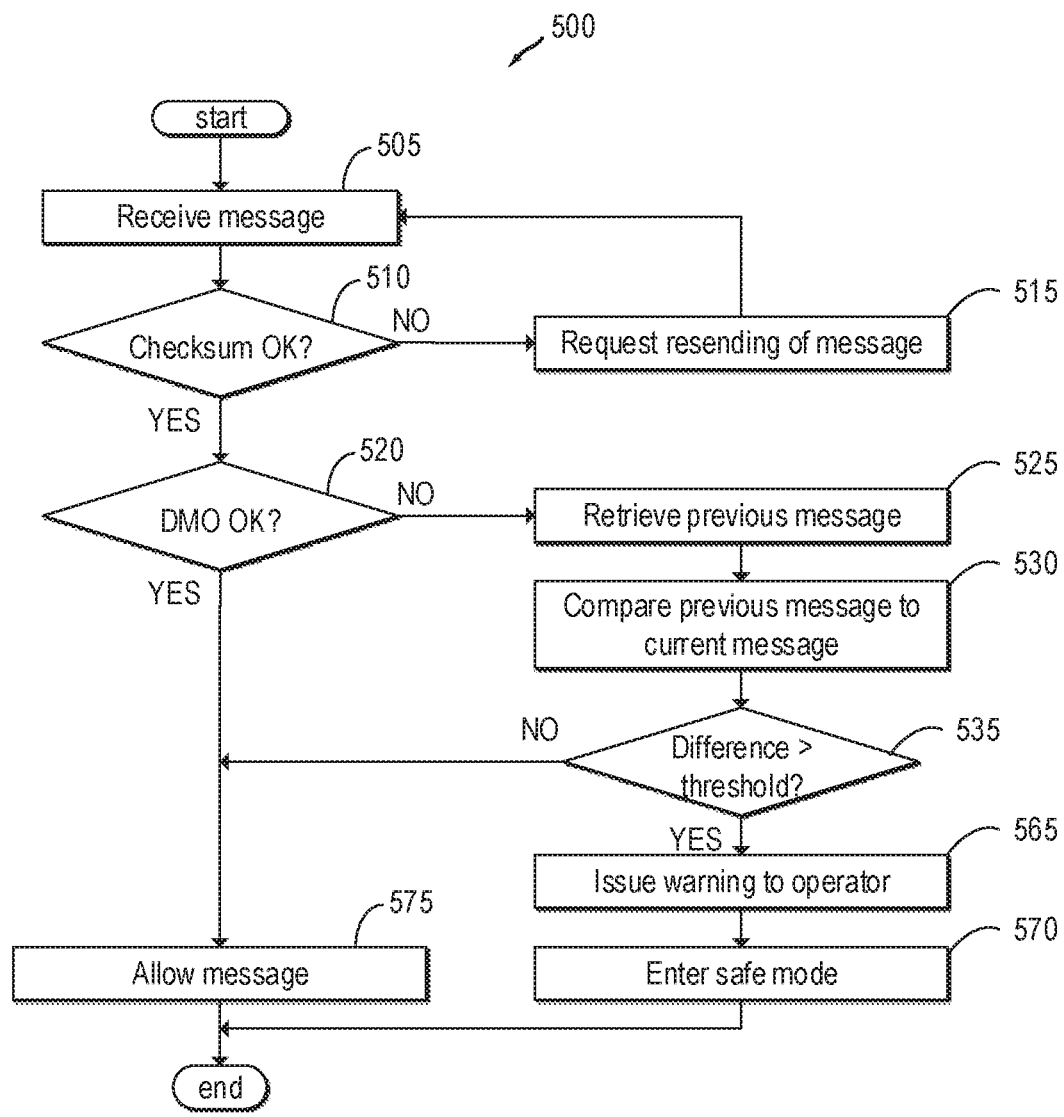
FIG. 5 shows an example method for detecting security breaches in a second embodiment.
Figure 6:
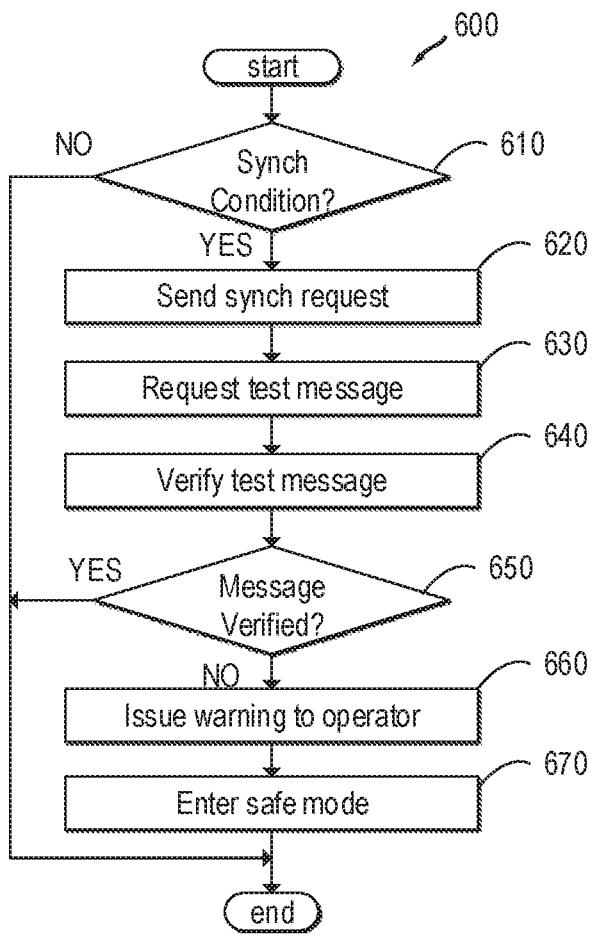
FIG. 6 shows an example method for synchronizing dynamic mathematical operator keys.

The following description relates to systems and methods for determining the presence of hacking or malicious interference in intra-vehicle communication systems. A vehicle engine system, which may include sensors and actuators communicatively coupled to ECUs, the ECUs in communication with a CAN bus including a Threat Assessment Gateway (TAG), is shown in FIG. 1. The CAN bus, including associated CAN nodes such as the TAG and various ECUs is depicted in FIG. 2. Communications on the CAN bus may be carried out via CAN frames, such as that depicted in FIG. 3A, which may include a checksum and a DMO according to the present disclosure, such as those depicted in FIG. 3B. The DMO may be employed in detecting the presence of hacking, or differentiating hacking from transmission error, according to the method shown in FIG. 4. Engine operating parameters and other considerations may also be employed to help distinguish hacking-caused errors from non-hacking-caused errors according to the method shown in FIG. 5. Finally, FIG. 6 shows an example method for synchronizing the different engine subsystems, ECUs, and the TAG.

FIG. 1 depicts a schematic diagram of one cylinder of engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal (PP). Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Crankshaft 40 may also be coupled to a starter motor via a flywheel to enable a starting operation of engine 10. Further, a crankshaft torque sensor may be coupled to crankshaft 40 for monitoring cylinder torque. In one example, the torque sensor may be a laser torque sensor or a magnetic torque sensor. Still other torque sensors may be used. The cylinder torque may be estimated using measured position signals from the torque sensor. Still other methods may be used to estimate cylinder torque.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two more exhaust valves. In this example, intake valve 52 and exhaust valve 54 may be controlled by cam actuation via one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from fuel system 172. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow (MAF) sensor 120 and a manifold air pressure (MAP) sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

A pressure sensor 124 may be coupled to exhaust passage 48 downstream of exhaust valve 54 and upstream of emission control device 70. Pressure sensor 124 is preferably positioned close to exhaust valve 54 to measure the exhaust manifold pressure (EMP). In one embodiment, pressure sensor may be a pressure transducer.

An upstream exhaust gas sensor 126 is shown coupled to exhaust passage 48 upstream of emission control device 70. Upstream sensor 126 may be any suitable sensor for providing an indication of exhaust gas air-fuel ratio such as a linear wideband oxygen sensor or a universal exhaust gas oxygen (UEGO) sensor, a two-state narrowband oxygen sensor or EGO, a heated exhaust gas oxygen (HEGO) sensor. In one embodiment, upstream exhaust gas sensor 126 is a UEGO sensor configured to provide output, such as a voltage signal, that is proportional to the amount of oxygen present in the exhaust. Controller 12 uses the output to determine the exhaust gas air-fuel ratio.

Emission control device 70 is shown arranged along exhaust passage 48 downstream of exhaust gas sensor 126. Device 70 may be a three way catalyst (TWC), configured to reduce NOx and oxidize CO and unburnt hydrocarbons. In some embodiments, device 70 may be a NOx trap, various other emission control devices, or combinations thereof.

A second, downstream exhaust gas sensor 128 is shown coupled to exhaust passage 48 downstream of emissions control device 70. Downstream sensor 128 may be any suitable sensor for providing an indication of exhaust gas air-fuel ratio such as a UEGO, EGO, HEGO, etc. In one embodiment, downstream sensor 128 is a HEGO sensor configured to indicate the relative enrichment or enleanment of the exhaust gas after passing through the catalyst. As such, the HEGO sensor may provide output in the form of a switch point, or the voltage signal at the point at which the exhaust gas switches from lean to rich.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; exhaust manifold pressure (EMP) from pressure sensor 124; engine coolant temperature (ECT) from temperature sensor 112 coupled to cooling sleeve 114; a profile ignition pickup signal (PIP) from Hall effect sensor 118 (or other type) coupled to crankshaft 40; a cylinder torque from the crankshaft torque sensor coupled to crankshaft 40; throttle position (TP) from a throttle position sensor; and absolute manifold pressure (MAP) signal from sensor 122. Engine speed signal, RPM, may be generated by controller 12 from signal PIP. Controller 12 also may employ the various actuators of FIG. 1 to adjust engine operation based on the received signals and instructions stored on a memory of the controller.

Storage medium read-only memory 106 can be programmed with computer readable data representing non-transitory instructions executable by processor 102 for performing the methods described below as well as other variants that are anticipated but not specifically listed.

The architecture of controller 12 shown in FIG. 1 is merely exemplary. In some examples, controller 12 may be embodied as a plurality of ECUs communicatively coupled to a CAN bus for communication with each other and other vehicle subsystems. This may further include a TAG in communicative contact with the CAN bus for evaluating the security of CAN bus communications in real time. This system architecture is further elaborated with reference to FIG. 2, below.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine, and each cylinder may similarly include its own set of intake/exhaust valves, fuel injector, spark plug, etc. The system shown in FIG. 1 may be an example of a technical environment suitable for the use of the Threat Assessment Gateway and associated methods, described in more detail below. For example, controller 12 may employ intravehicular communications along a CAN bus which may be susceptible to malicious interference; provision of a checksum and a DMO according to the present disclosure may help prevent such hacking, and/or may enable the vehicle systems to take appropriate compensatory action, as described below.

FIG. 2 schematically illustrates an exemplary technical environment, system 200, for the threat assessment systems and methods disclosed herein. In one example, system 200 may comprise part of engine 10 shown in FIG. 1, by being in communicative contact with controller 12 or taking the place of controller 12. System 200 includes a CAN bus 210 for communication between different nodes communicatively coupled thereto. Communication on the CAN bus 210 may comprise communication between different electronic control units (ECUs), or between an ECU and the TAG, for example. Other examples of microcontrollers, sensor, or actuators may be in communication with the CAN bus and the other components connected with the CAN bus. Controllers, components, ECUs, etc., which are in communication with the CAN bus may be generally referred to as CAN nodes.

A first CAN node depicted in FIG. 2 is the Threat Assessment Gateway (TAG) 225. TAG 225 may comprise a microcontroller or other suitable processing device. TAG 225 may be communicatively coupled to CAN bus 210 in order to communicate with other CAN nodes such as ECUs 230*a-d* and the sensors and actuators coupled thereto. TAG 225 may be configured to send and receive messages on the CAN bus, such as CAN frames containing a checksum and a DMO output, described in further detail below. TAG 225 may include a processor and a storage device including instructions stored in non-transitory memory to execute one or more of methods 400, 500, or 600, described below, or another method consistent with the teachings of this disclosure.

CAN nodes may further include one or more ECUs, such as ECUs 230*a-d*. These ECUs may control different aspects of operation of a vehicle, and may be disposed at different locations in the vehicle, or may be instantiated as instructions stored in non-transitory memory of a central controller or computer, in some examples. ECUs 230*a-d* may include a processor, non-transitory memory including instructions for adjusting one or more aspects of vehicle operation, and a communication interface for communicating with the CAN bus, as well as with one or more sensors or input devices, for example sensors 232*a-d* and actuators 234*a-d*.

Sensors 232*a-d* may include many different sensors disposed on a vehicle, such as those discussed above with respect to FIG. 1. Some examples of sensors which may include sensors for detecting oxygen, mass air-flow, exhaust gas composition, temperature of different engine components, torque, engine speed, knock/pre-ignition, pedal position, throttle position, pressure at different locations, air-fuel ratio, EGR, or other conventional or well-known sensors. ECUs may receive input from the sensors and take actions based thereon. For example, an ECU may elect to adjust an engine operating parameter based on data received from a sensor, or to communicate the data received from the sensor to another component via the CAN bus. Sensors 232*a-d* may include pedal position sensor 134, intake and exhaust position sensors 55, MAF sensor 120, pressure sensor 124, exhaust gas sensors 126 and 128, EGR sensor 144, temperature sensor 112, Hall effect sensor 118, and/or MAP sensor 122. Still other sensors may be employed. In some embodiments, sensors 232*a-d* may be employed to assist in determining the presence of malicious tampering or other security breaches, as discussed below with reference to method 500.

ECUs 230*a-d* may also be communicatively connected to actuators 234*a-d*. Actuators may be coupled to one or more vehicle components in order to adjust operating parameters in accordance with ECU instructions. Example actuators which may be coupled to ECUs include actuators for a throttle valve, wastegate, EGR valve, grille shutters, fan, air-conditioning/HVAC system, brakes, steering system, lighting, fuel pump, fuel injectors, transmission, or other conventional or well-known vehicle actuators. Actuators 234*a-d* may be adjusted in accordance with ECU instructions, based on data received from the sensors. In some embodiments, actuators 234*a-d* may be employed to adjust one or more engine operating parameters in response to a determination of the presence of hacking, as discussed below with reference to methods 400, 500, and 600. Actuators 234*a-d* may include servomechanical devices, solenoid valves, electrically- or mechanically-operated pumps, or other such devices coupled to vehicle components and operable to adjust the operating parameters thereof. For example, actuators 234*a-d* may include or be operatively coupled to one or more of intake valve 52, exhaust valve 54, fuel injector 66, throttle 62, ignition system 88, or EGR valve 42. Still other actuators are possible within the scope of the present disclosure.

As will be appreciated by one of ordinary skill in the art, the schematic example depicted in FIG. 2 is illustrative, and not intended to be limiting. For example, while the example system 200 is depicted as comprising four ECUs, a system may have more or fewer ECUs without departing from the scope of this disclosure. Further, the CAN bus may be in communication with microcontrollers or other components which may also employ the methods taught herein. Further, while each ECU is depicted as being in contact with a single sensor and a single actuator, individual components may be in communicative contact with more or fewer actuators or sensors without departing from the scope of this disclosure. Still other variations are possible, as will be readily appreciated by one with skill in the art.

In one example, ECUs 230*a-d* may be embodied as conventional ECUs, such as a body control module (BCM), powertrain control module (PCM), antilock braking system (ABS), restraint control module (RCM), Multimedia ECU, or other ECUs. Thus, an example ECU comprising a PCM may include communicative coupling to a plurality of different sensors monitoring operation of the powertrain, including oxygen sensors, MAF sensors, exhaust gas sensors, torque sensors, knock sensors and so forth. The ECU may receive input from each of these sensors and use said input to carry out instructions stored in non-transitory memory, such as by adjusting one or more actuators. Continuing with the example of the PCM, the actuators may include intake and exhaust valves, throttle valve, fuel injectors, ignition system, automatic transmission clutches, and so forth. The PCM may also be in communicative contact with the CAN bus and other nodes on the CAN bus, and the PCM may send and receive CAN frames relating to the operation of the powertrain. Numerous other types of ECUs and other CAN nodes are also contemplated.

Figure 3A:
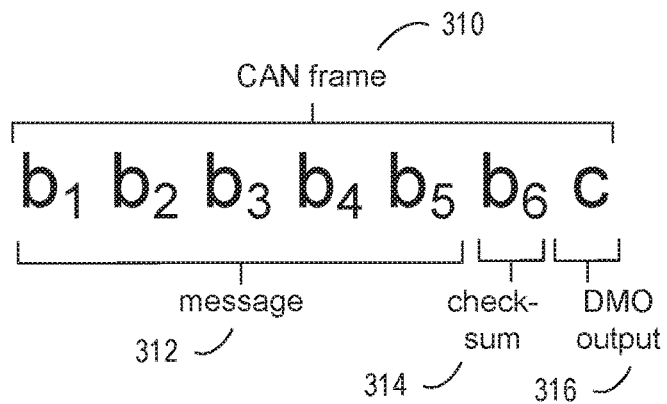
FIG. 3A depicts an example CAN frame including checksum and dynamic mathematical operator.

Communication across the CAN bus conventionally occurs via CAN frames. One example CAN frame for use in the methods described below is shown in FIG. 3A. CAN frame 310 may comprise a series of bytes concatenated together. In this example, the CAN frame comprises seven bytes, referred to as $b_1$, $b_2$, $b_3$, $b_4$, $b_5$, $b_6$, and c. Thus, the entire CAN frame may be represented by concatenating these bytes together thus: $b_1 b_2 b_3 b_4 b_5 b_6 c$. This CAN frame is merely exemplary; CAN frames may have a greater or lesser number of bytes without departing from the scope of this disclosure. Further, while the bytes herein will be described using base-10 for simplicity, it is understood that bytes may be represented in other bases, such as binary, octal, or hexadecimal.

The CAN frame 310 shown in FIG. 3A is represented as having three basic fields: a message 312, a checksum 314, and a dynamic mathematical operator output 316. The message 312 may comprise data which is intended to be communicated across the CAN bus, which may include a sensor reading, a desired actuator position, or other appropriate communication, for example. The checksum 314 may comprise a cyclic redundancy check (CRC) value, used to determine the presence of transmission errors. The DMO output 316 may be computed by the TAG according to a private mathematical function, described in more detail below. A CAN frame may also include additional data fields which are not represented in FIG. 3A. For example, a CAN frame may include a start-of-frame bit, a unique identifier, a priority, a remote transmission request, an identifier extension bit, a reserved bit, a data length code (indicating the number of bytes in the message), a CRC delimiter, an acknowledgement slot, an acknowledgement delimiter, and an end-of-frame field. These additional fields will be well understood by one with ordinary skill in the art.

Figure 3B:
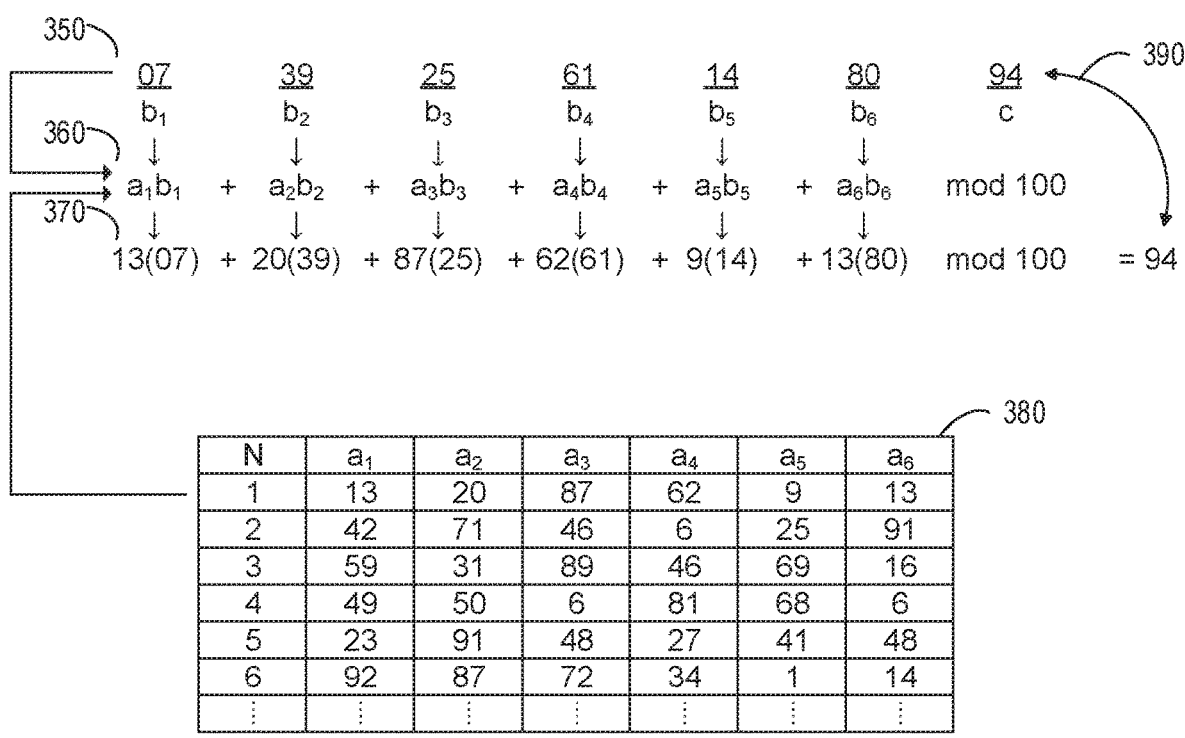
FIG. 3B depicts an example method for computing and verifying the dynamic mathematical operator in accordance with one or more embodiments.

FIG. 3B shows an example of how the DMO output is computed and checked according to the methods disclosed herein. In this example, line 350 shows a series of bytes 07 39 25 61 14 80 94, corresponding to the bytes of the CAN frame $b_1$ $b_2$ $b_3$ $b_4$ $b_5$ $b_6$ c, respectively. Byte c represents the DMO output, which is computed according to the DMO based on bytes $b_1$-$b_6$ according to a particular mathematical function. Line 360 shows a sample DMO, e.g. a mathematical function used to compute the DMO output, in this case a weighted sum of the bytes $b_1$-$b_6$, modulo 100. Assuming no transmission errors and no hacking, the weighted sum modulo 100 should evaluate to 94, the value of byte c, which indicates that no hacking has occurred. Line 360 includes variables representing bytes $b_1$-$b_6$ and corresponding weight parameters $a_1$-$a_6$, which are drawn from DMO key table 380.

It will be appreciated that, without knowing the values of weight parameters $a_1$-$a_6$, the chances of correctly guessing the value of DMO output c are very small. The values of parameters $a_1$-$a_6$ are therefore stored in a private table 380, and not publicly accessible. Thus, a potential hacker attempting to distribute malicious messages on the CAN bus would be unable to reliably provide correct values for DMO output c. DMO key table 380 includes a plurality of sets of parameters $a_1$-$a_6$, indexed by key N. The TAG and the various ECUs may use a common key N to compute and verify the DMO. The key may be changed or advanced at intervals in order to prevent hackers from potentially learning the value of the parameters used in the DMO, thus table 380 includes many keys with different corresponding parameters. In some examples, the table may also specify a mathematical function; that is, the TAG system may not be limited to only using one type of function while varying the parameters, but may also employ a different function with different parameters for each key. More details regarding advancing the key are described below with respect to methods 400 and 600.

To evaluate the DMO, the TAG may substitute the actual values of $b_1$-$b_6$ from the current CAN frame and the actual values of parameters $a_1$-$a_6$ into the expression shown in line 360 (substitutions illustrated schematically with arrows). In this example, the parameters corresponding to key N=1 are employed. Line 370 shows the DMO after substitutions have been made. The weighted sum is then carried out, modulo 100, and the result is found to be 94. This is then compared to the DMO output byte c, as indicated schematically at 390. In this case, the DMO is verified, since the computed value of the DMO matches the actual DMO output byte c. If these numbers did not match, it may be indicative of potential hacking or malicious interference. This is described in more detail below with reference to method 400.

The table 380 comprising a plurality of keys and associated parameters may be provided in non-transitory memory in the TAG and in the plurality of ECUs in communicative contact with the TAG via the CAN bus. Alternatively, the TAG may be provided with a plurality of distinct tables, and each ECU in communicative contact with the TAG may be provided with one matching table of DMO parameters. In this way, the TAG may have unique DMOs for each ECU in the system. The tables may be preloaded in memory into each of the CAN nodes at the factory, thus obviating any need for the TAG to distribute the DMO parameters to the various ECUs, for example. This may prevent a hacker from learning the parameter values by "sniffing." The table of parameters may be randomly or procedurally generated. Further, the parameter tables may be unique to each vehicle, and the parameters used therein may not be publicly known. Thus, a potential hacker may have no access to the functions used to compute the DMO, in contrast to the checksum. Further, using unique tables for each vehicle prevents potential hackers from learning the DMO parameters from another vehicle, for example by repeated testing of ECU communications in a vehicle of the same make and model.

In the example shown in FIG. 3B, the DMO is shown as a function comprising a weighted sum, modulo 100, of the constituent bytes of a CAN message. However, this is presented as an example, and is not intended to be limiting. In other examples, a DMO may comprise many different types of mathematical operation which use the constituent parts (e.g. bytes) of a message (e.g. CAN frame) to arrive at a uniquely-determined number. That is, a DMO is herein understood to comprise a mathematical function of the constituent parts (e.g. bytes) of a message. Thus, a DMO according to the present disclosure may comprise a weighted sum, polynomial, exponential, trigonometric, or other linear or non-linear function of the units of a message. In other examples, a DMO may be understood to include an encryption of the message, for example according to conventional public-key encryption methods. Still other examples are possible.

A further advantage of the TAG checksum and DMO system is that it takes advantage of existing intra-vehicular communication architecture. That is, the TAG may essentially be retro-fitted to an existing CAN bus with minimal modifications of other vehicle components. This allows simple yet robust protection from malicious interference at minimal cost. Using the checksum and DMO method, the TAG may be able to effectively differentiate between hacking and ordinary transmission errors, without the need for substantially increased computational resources or extensive specialized hardware or software, according to one or more of the following methods.

Figure 4:
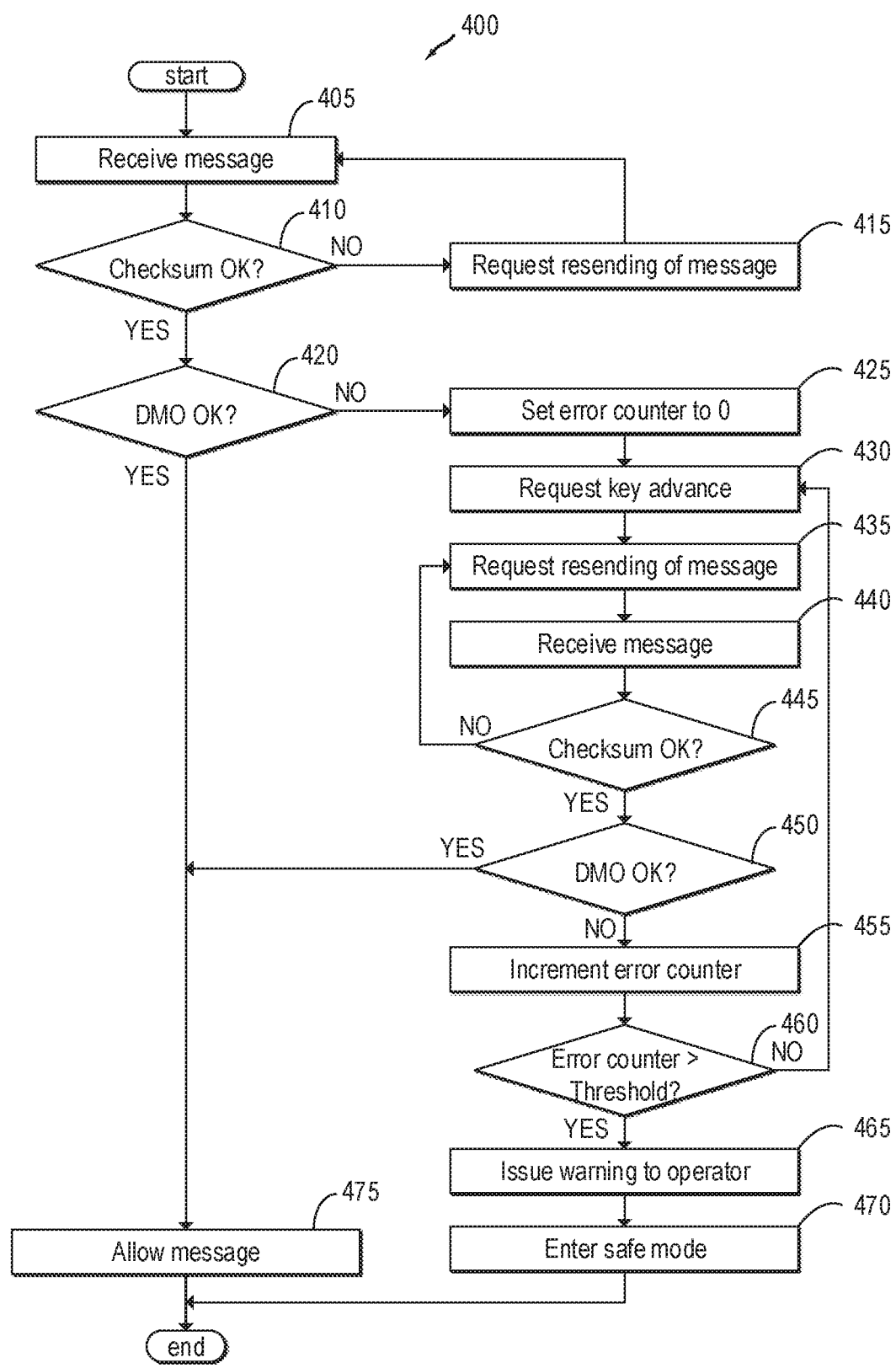
FIG. 4 shows an example method for detecting security breaches in a first embodiment.

FIG. 4 shows an example method 400 of detecting potential hacking or malicious tampering with vehicle CAN communications according to this disclosure. Method 400 begins at 405 where a message is received at the TAG device. The message may comprise a CAN message including a checksum and a DMO output field, as discussed above. When the message is received, the method proceeds to 410.

At 410 the method determines if the checksum is correct. This may be performed according to known methods for conventional CAN checksums, e.g. cyclic redundancy checks. Since the inclusion of the checksum is well known according to standards for CAN communication, it is expected that any potential hacker or malicious threat would know of its existence and include a correctly calculated checksum according to the publicly-known CAN standards. Therefore, when an error is detected in the checksum, it is assumed that the error is due to transmission error, rather than malicious tampering. In this case, method 400 proceeds to 415, wherein the TAG requests that the message be resent, whereupon processing returns to 405. However, if the checksum of the message is received without error, processing proceeds to 420.

At 420, the method determines if the DMO output field is correct. As discussed above, the DMO is computed according to a secure or private function using private parameters. The DMO may be computed by a function of the CAN message which is not merely a sum of the individual bytes therein. For example, the DMO may be computed by a polynomial, exponential, or non-linear function of the bytes in the CAN message, as discussed in the example DMOs discussed above. In other examples, the TAG may employ public-key encryption methods rather than a simple mathematical function, for instance. The DMO may be computed based on a current key, which may be changed periodically or on an event-driven basis, as discussed in more depth below. Since the parameters and/or functions for determining the DMO are not publicly available, it is assumed that an error in the DMO (e.g. a discrepancy between the DMO output included in the message and that results of the DMO function as applied directly to the message) may be due to malicious tampering or hacking. However, it is also possible that an error in the DMO is due to a transmission error (e.g. a transmission error which happens to only affect the byte containing the DMO output). Thus, if an error is detected in the DMO, the method enters a verification subroutine at 425 to discriminate between transmission errors and hacking attempts. On the other hand, if the DMO is determined to be correct at 420, the method proceeds to 475.

At 425, the method initializes an error counter to zero and proceeds to 430.

At 430, the method requests a key advance. As described above, each module or control unit in the vehicle includes a lookup table with a plurality of keys, each key containing respective DMO parameters. When the TAG requests a key advance at 430, the TAG and all ECUs or other subsystems which are in communication with the TAG advance to the next key in the table. In another embodiment, each ECU may have a different table, and the TAG may have corresponding tables for each ECU; in this case, only the relevant ECU and corresponding table in the TAG are advanced to the successive key. Processing then proceeds to 435.

At 435, the TAG may request that the previous message be resent. It will be appreciated, however, that for some vehicle systems, messages may become out-of-date quickly, thus the TAG may simply request that a new message is sent instead. For example, if a message containing a throttle request were sent and determined to have a DMO error, and if some time has passed since the sending of the original message, the throttle request in the previous message may no longer be indicative of the actual (current) throttle request; thus, to preserve robust operation of the vehicle, it may be more expedient to request a new message containing the throttle request, rather than requesting that the previous (out-of-date) throttle request be resent. Once the request to resend the previous message is complete, or the request to send a new message is complete, processing proceeds to 440.

At 440, the TAG receives a new message from the ECU in question. This message may be a resent copy of the previous message or a new message in accordance with the above. Once the requested message is received, processing proceeds to 445.

At 445, the TAG evaluates the checksum in the newly received message, in the same manner as described above with respect to block 410. If the checksum evaluates correctly, processing proceeds to 450. Otherwise, processing returns to block 435 where a resend request is issued.

At 450, the TAG evaluates the DMO in the newly received message, in the same manner as described above with respect to block 420. If the DMO evaluates correctly, this indicates that hacking, malicious tampering, or another type of security breach is unlikely, and processing proceeds to 475. If the DMO does not evaluate correctly, processing proceeds to 455.

At 455, the error counter is incremented, whereupon processing proceeds to 460. At 460, the TAG may evaluate whether the error counter exceeds an error threshold. The error threshold may be a predetermined number of errors, above which it is determined that a security breach due to hacking or malicious tampering is likely. The error threshold may be preprogrammed at the factory, or may be determined according to operating conditions. For example, the TAG may determine how likely it is that a potential security breach could cause safety issues, and adjust the error threshold accordingly. In one example, the TAG may select a higher (more lenient) error threshold if the vehicle is stopped with the transmission in Park, and a lower (stricter) error threshold if the vehicle is travelling at highway speeds, since tampering with the vehicle communication system is more likely to result in a collision and/or injury in the latter condition. In another example, the error threshold may be different for different ECUs or vehicle systems to which the CAN messages pertain. For example, more critical vehicle systems (engine, steering, brakes) may be given a lower (stricter) threshold and less critical vehicle systems (multimedia, HVAC) may be given a higher (more lenient) threshold. If the error counter exceeds the threshold, a potential security threat may be determined and processing may proceed to 465. If the error counter does not exceed the threshold, processing may return to 430 to request a new key advance.

At 465, a possible security breach, malicious tampering, or hacking has been deemed likely. The method thus proceeds to issue a warning to an operator of the vehicle. The warning may include a visual or auditory warning, such as the illumination of an indicator lamp, the display of a textual message on a screen of a multimedia device, or an audible warning such as a buzzer or text-to-speech generated message. The warning may be reproduced via a speaker or displayed via a display device such as a screen. In other examples, the TAG may issue the warning to the user by sending a SMS text message or phone call to a user's phone, or may communicate with a user's smartphone by Bluetooth or other communicative coupling. The warning may inform an operator that malicious tampering with the vehicle has been detected (or is likely). The warning may issue instructions to the operator, which may be based on the detected properties of the tampering. For example, tampering which affects only less-critical systems (HVAC, multimedia) may result in instructions for the operator to seek a service station soon, whereas tampering with more-critical systems (engine, brakes, steering) may result in instructions for the operator to pull the vehicle over and seek immediate help. In some examples, the warning may include a prompt for the user, asking for the user to authorize entering safe mode (explained below). Upon issuing a warning to the vehicle operator, processing may proceed to 470.

At 470, the vehicle may optionally enter a safe mode. The vehicle may enter the safe mode automatically upon detection of potential hacking, or may first request operator authorization to enter safe mode. Entering safe mode may include restricting some or all of the functionality of the vehicle. This may include shutting down non-essential systems, such as the multimedia system, HVAC system, power windows, etc. This may include limiting certain engine operating parameters to stay within threshold ranges, such as limiting vehicle speed to less than a threshold speed, limiting engine torque to less than a threshold torque, limiting engine speed to less than a threshold engine speed, limiting the transmission to certain gears, and so forth. This may also include adjusting one or more engine operating parameters (e.g. by adjusting one of the aforementioned actuators), such as engine speed, throttle, fuel injection amount or timing, ignition timing, boost, transmission gear selection and/or clutch position, steering, braking, lighting, or other appropriate parameters. In one example, safe mode may include disabling autonomous driving features, such as lane assist, parallel parking assist, or fully autonomous driving, if the vehicle is equipped with these features. In another example, the vehicle may instead initiate a specialized autonomous driving feature which includes instructions to take control of the vehicle, pull over to the side of the road, stop, and shut the vehicle off at the soonest safe opportunity. Entering safe mode may further include deactivating wireless communication systems, such as wireless Internet connection, wireless LAN, Bluetooth, or others, to attempt to prevent hackers from continuing to access vehicle systems remotely. Entering safe mode may include issuing a message to the operator indicating that the vehicle is in safe mode, and that the vehicle may not respond in the manner that the operator is used to. Safe mode may be maintained until the operator seeks a service station, or until the operator issues a request to exit safe mode, in some examples. After the vehicle enters safe mode, processing ends.

At 475, the message may be deemed likely to be safe, and may be allowed to propagate to its intended destination, such as an ECU, actuator or other CAN node. Processing then ends.

The method of security breach detection shown in FIG. 4 relies on counting successive errors in the CAN messages received. In other examples, the method may not compute a number of consecutive errors, but may instead compute a ratio of errors, for example. In this case, the method may determine that a security breach is likely if the ratio of error-free messages to messages with errors sinks below a threshold. For example, if less than 95% of received messages are error-free, the method may determine a possible security breach. As before, the threshold may depend on which ECU and/or vehicle systems the message pertains to, such that more critical vehicle systems (engine, steering, brakes) may be given a higher (stricter) threshold and less critical vehicle systems (multimedia, HVAC) may be given a lower (more lenient) threshold. FIG. 5 shows yet another example method for determining possible security breaches which may be performed instead of or in addition to the method of claim 4.

FIG. 5 depicts another example method 500 for determining the presence of hacking or security breaches. Blocks 505-520 correspond to blocks 405-420 and will not be described in detail, but it is understood that these processing blocks may be substantially similar to the corresponding processing blocks in method 400. Method 500 begins at 505, where a message is received at the TAG. At 510, the TAG evaluates the checksum. If the checksum contains an error, processing proceeds to 515 where a message resend request is issued, whereupon processing returns to 505. If the checksum is correct, processing proceeds to 520. At 520, the TAG evaluates the DMO. If the DMO contains no errors, processing proceeds to 575. If the DMO contains an error, processing proceeds to 525.

At 525, the method includes retrieving a previous message. The previous message may be a message which corresponds to the same ECU or engine system as the current message under consideration. For example, if the current CAN message relates to a throttle position request, the TAG may attempt to retrieve the most recent CAN message which contains a throttle position request prior to the current request. The previous message may be stored in short-term transitory memory, such as RAM. If the previous message is not available, the method may attempt to estimate the value of the previous message by consulting the output of an associated sensor (in the present example, a throttle position sensor). Processing may then proceed to 530.

At 530, the method includes comparing the previous message to the current message. This may include comparing the command portion of the current message to the command portion of the previous message to obtain a difference. Continuing with the example of the throttle position request, at 530 the method may compute a difference (e.g. an absolute difference) between the current throttle position request and the previous throttle position request. In another example, the method may compute a ratio, or use another appropriate comparison. Processing proceeds to 535.

At 535, the method determines if the difference between the current message and the previous message is greater than a threshold. In alternative examples, the method may evaluate whether the ratio between the current message and the previous message is greater than a threshold. The threshold may be a predetermined value which is preprogrammed at the factory or is determined based on engine operating conditions or other parameters. The threshold is selected to determine when changes in operating parameters (steering wheel position, throttle request, etc.) are abruptly changed, which may be indicative of hacking or malicious tampering. Thus, if a throttle position request changes from one CAN message to a subsequent CAN message by an amount greater than a threshold, the TAG may determine that hacking is likely. Sudden changes in steering position, braking position, or other parameters may also indicate hacking.

Multiple vehicle operating parameters may be considered at block 535, and the determination of hacking may be more complex than a simple comparison of a difference to a threshold. For example, the application of the parking brake, or a request to shift the transmission into park or reverse while the vehicle is travelling at speed may be recognized by the TAG as a potential hacking event. Similarly, a request to deploy airbags may be indicative of hacking when body sensors are not indicating deformation and/or when accelerometers are not indicating a collision event. The difference threshold may also change based on current operating parameters. For example, when a vehicle is stopped or at very low speed, the TAG may allow relatively large, sudden changes in steering wheel position (e.g. for parallel parking), thus the TAG may set a higher difference threshold for steering. However, if the vehicle is travelling at highway speeds, sudden changes in steering wheel position may be unexpected and therefore indicative of possible hacking, thus the TAG may set a lower difference threshold for steering. The TAG may employ location/GPS data to determine appropriate and expected operating parameter ranges and variation. The TAG may also employ historical driver behavior data to determine if the operator is driving in a manner consistent with patterns determined from past driving data.

If, at 535, the TAG determines that hacking is likely on the basis of an operating parameter change exceeding a threshold, or on the basis of other operating parameters or considerations such as those discussed above, processing proceeds to 565. If the TAG determines that hacking is not likely, due to the operating parameter change being less than the threshold and/or based on other considerations, processing proceeds to 575.

Blocks 565-575 correspond to blocks 465-475 and will not be described in detail, but it is understood that these processing blocks may be substantially similar to the corresponding processing blocks in method 400. At 565, the method includes issuing a warning to the operator and proceeds to 570. At 570, the vehicle optionally enters safe mode and processing then ends. At 575, the method allows the message and then ends.

Methods 400 and 500 are two example methods for determining the possible presence of malicious tampering or hacking in a vehicle system such as an ECU communicatively coupled to a CAN bus. In some examples, a vehicle may execute only one of methods 400 or 500 in order to determine the presence of hacking, however this is not necessarily the case. In some examples, both methods may be employed simultaneously, or features of each method may be employed to determine if tampering has occurred. For example, a vehicle may employ both the repeated error-checking disclosed in method 400, as well as the operating parameter comparison taught in method 500, in order to increase the overall reliability of the hacking detection method, thereby helping to reduce the occurrence of false positive detections.

The methods taught herein may make use of dynamic mathematical operators indexed by DMO keys, as discussed above. Generally, it is assumed that the current DMO key employed in the TAG and that employed in the ECUs will be the same: that is, the modules are all initialized with the same table of keys starting at, for example, N=1 (e.g. see FIG. 3B). Similarly, the ECU and the various modules are typically advanced together, such as when the vehicle is turned on or when a possible error is detected. Thus, it is assumed that the DMO keys of the ECU and the modules are generally synchronized. However, due to tampering, transmission errors, local faults, etc., it is possible that the ECU and the modules may become out of synch with one another. For this reason, method 600 is proposed as a method for synchronizing the DMO keys.

Method 600 starts at 610, wherein it is determined if synchronization conditions are met. The method may synchronize the DMO keys on a regular or periodic schedule (e.g., every 1 second, or other appropriate interval). In another example, the method may synchronize DMO keys in response to a detected DMO error indicating potential hacking (e.g. when block 420 evaluates to NO). Thus, method 600 may also form part of method 400, in some examples. In other examples, the DMO keys may be synchronized on an event-driven basis, such as in response to a key-on or key-off event, an engine start or stop event, or other appropriate event. In still other examples, the key may be synchronized in response to an unexpected operating parameter (e.g. when block 535 evaluates to YES). Thus, method 600 may also form part of method 500, in some examples. If it is determined that synchronization is warranted based on current conditions, the method proceeds to 620. If synchronization is not needed, the method ends.

At 620, the TAG issues a synchronization request. The synchronization request may take the form of a standard CAN frame, or other appropriate message format. The TAG may issue the synchronization request to all ECUs/modules on the CAN bus, or only to a subset of ECUs, depending on whether the DMO key table is shared among all ECUs, or whether individual ECUs receive individual, different DMO key tables. The synchronization request may include a checksum (e.g. a cyclic redundancy check), but not a DMO output field. This may be performed to ensure that the synchronization request is understood by the ECUs, since the ECU keys may not be synchronized with the TAG. The synchronization request may include the number of a desired key (e.g. N=32), which is the target key for the TAG and all ECUs to switch to. The target key may simply be the current key being used by the TAG, the next key in the table, or an arbitrarily-chosen key. Upon sending the request, the TAG switches to the target key. Upon successful receipt of the synchronization request, the ECUs also switch to the target key, thus the TAG and the ECUs become synchronized. The method attempts to verify that the synchronization was successful in the following blocks 630-650. Once the synchronization request is sent, the method proceeds to 630.

At 630, the TAG requests a test message to be sent from the ECUs to the TAG. This request may be sent as part of the synchronization request message, or may be sent as an additional message after the synchronization request is sent. If the test message request is sent as a separate message, it may include a DMO output field calculated using the new DMO key specified in the synch request. Upon receipt of the test message request, the ECUs may send a dummy message (e.g. a message which does not issue a command) back to the TAG. Once the test message request has been sent, processing proceeds to 640.

At 640, the method verifies the test (dummy) message returned by the ECUs. This may include evaluating a separate test message from each ECU connected to the CAN bus. Verifying the test message may be performed according to a method similar to method 400, e.g. by evaluating the DMO according to the new key, requesting a resent message if the DMO has an error, and repeating until an error threshold is surpassed. If the DMO of the test message fails to be evaluated correctly (e.g. a threshold number of times), the message may not be verified. Alternatively, if no message is received, the message is not verified. Conversely, if the DMO evaluates correctly (or evaluates incorrectly only less than the threshold number of times), the message may be verified. Processing proceeds to 650.

At 650, it is evaluated if the message was verified in the previous processing block. If the message was verified, this may indicate that the synchronization request was successful, and that the TAG and the ECUs are correctly synchronized. In this case, the method ends. However, if the message is not verified, processing proceeds to 660.

At 660, it is determined that there is possible hacking or malicious tampering. The method may issue a warning to the driver, as is discussed above in block 465. Processing then proceeds to 670.

At 670, the vehicle may enter a safe mode. This may include restricting functionality of the vehicle or adjusting one or more operating parameters, as is discussed above in block 470. The method then ends.

Thus method 600 may provide for synchronizing DMO keys between the TAG and multiple ECUs or other components, as well as providing an additional opportunity for detection of hacking or tampering.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an Intra-vehicle communications network, comprising,
   receiving a network frame including a message from an electronic control unit, a first parameter and a second parameter concatenated together, wherein the second parameter comprises output of a dynamic mathematical operator;
   evaluating the first parameter based on a first mathematical operation on the message and evaluating the second parameter based on a second mathematical operation on the message, wherein the second mathematical operation is a function based on one or more additional parameters stored locally in non-transitory memory of a vehicle controller;
   indicating a network transmission error in response to an error in the first parameter including requesting retransmission of the message;
   indicating a digital security breach in response to an error in the second parameter including issuing a visual and auditory warning to an operator; and
   issuing a warning to an operator and adjusting a vehicle operating parameter in response to the digital security breach, the vehicle operating parameter being an engine operating parameter.

2. The method of claim 1, wherein the first mathematical operation is a cyclic redundancy check, and wherein the second mathematical operation is a function based on one or more additional parameters stored locally in non-transitory memory of a vehicle controller.

3. The method of claim 1, wherein the method further comprises entering a safe mode responsive to the indicated digital security breach and further responsive to an operator confirmation.

4. The method of claim 3, wherein entering the safe mode includes one or more of restricting vehicle speed, restricting vehicle torque, and deactivating autonomous driving features.

5. The method of claim 4, wherein entering the safe mode includes automatically stopping and shutting down a vehicle.

6. The method of claim 5, wherein entering the safe mode includes automatically deactivating non-essential vehicle systems, including a multimedia system and an HVAC system.

7. The method of claim 6, wherein entering the safe mode includes automatically deactivating wireless communication systems.

8. A system for a vehicle, comprising
   a controller area network (CAN) bus;
   an electronic control unit (ECU) connected to the CAN bus, an actuator, and a sensor;
   a processor connected to the CAN bus, and including computer-readable instructions stored in non-transitory memory for:
      receiving a network frame including a message from the ECU, the network frame including first and second fields, wherein the second field is generated by a dynamic mathematical operator based on bits of the message;
      in response to an error in the first field, requesting retransmission of the message;
      in response to an error in the second field, indicating a digital security breach and requesting retransmission of the message and incrementing an error counter; and
      in response to the error counter exceeding a threshold, issuing a warning to an operator and adjusting an operating parameter of the vehicle, wherein the first field is computed based on a cyclic redundancy check, and wherein the second field is computed by a function based on the message and one or more function parameters retrieved from a table stored locally in the non-transitory memory, wherein the operating parameter is an engine operating parameter.

9. The system of claim 8, wherein, in response to the error in the second field, advancing a key, the key indicating corresponding function parameters in the table.

10. The system of claim 9, wherein, in response to the message being retransmitted, computing the second field based on the function parameters corresponding to the advanced key.

* * * * *